Patented Feb. 5, 1929.

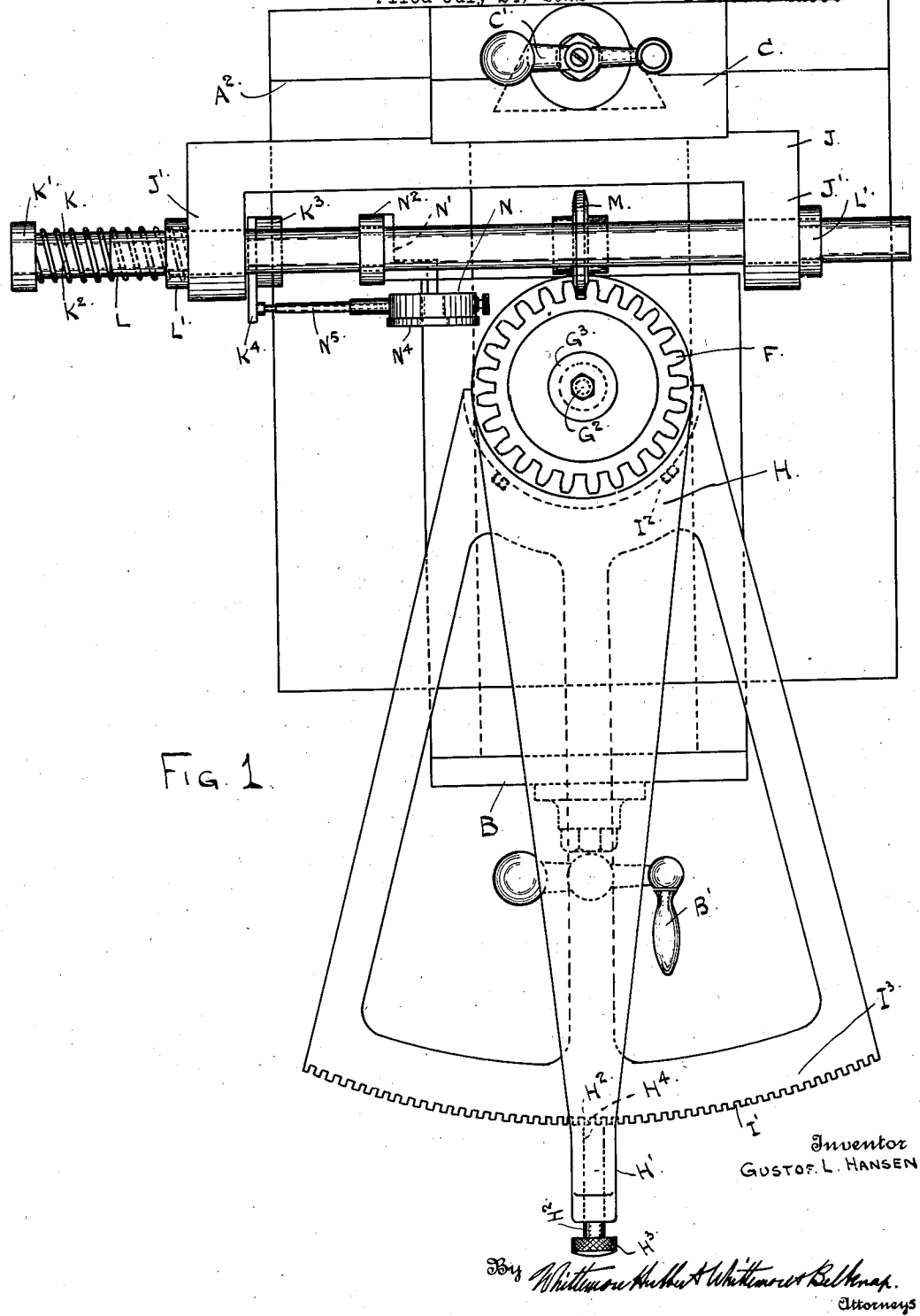

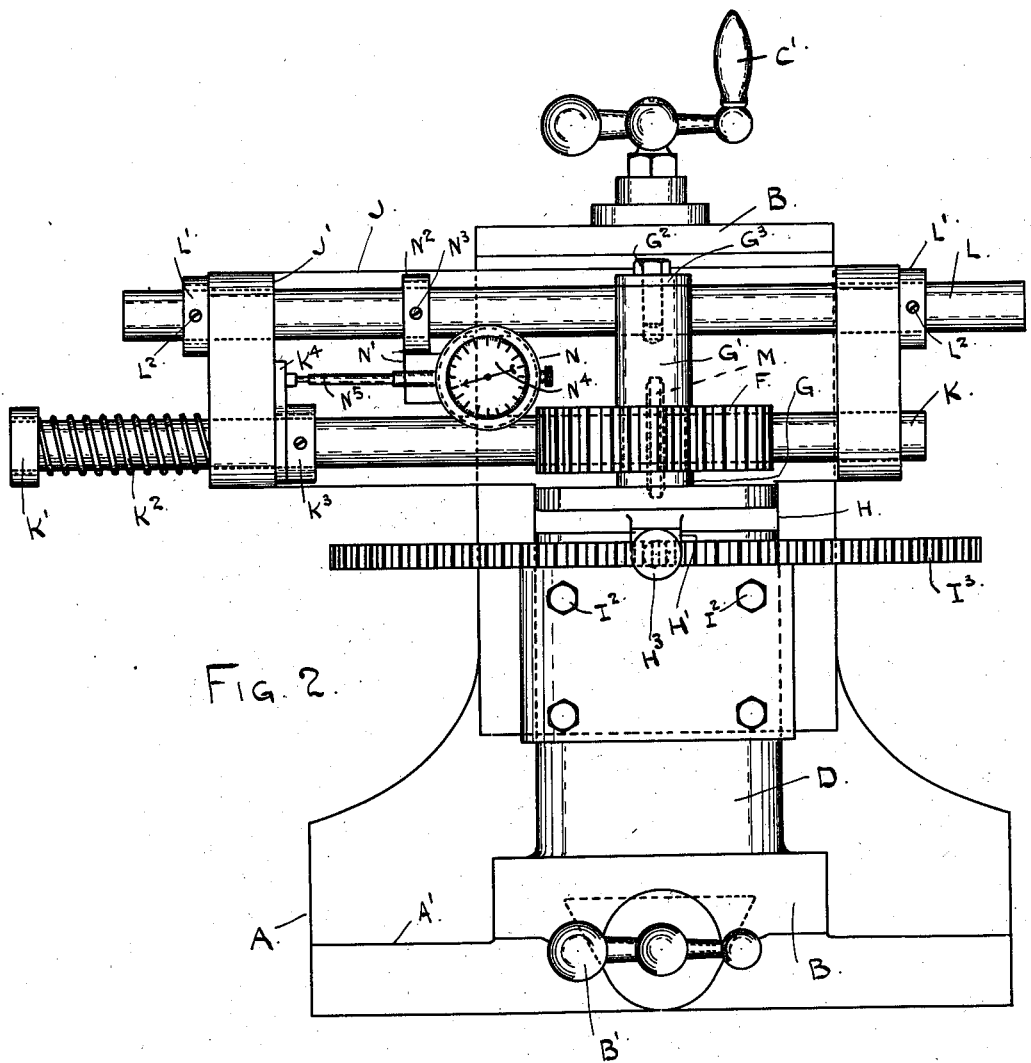

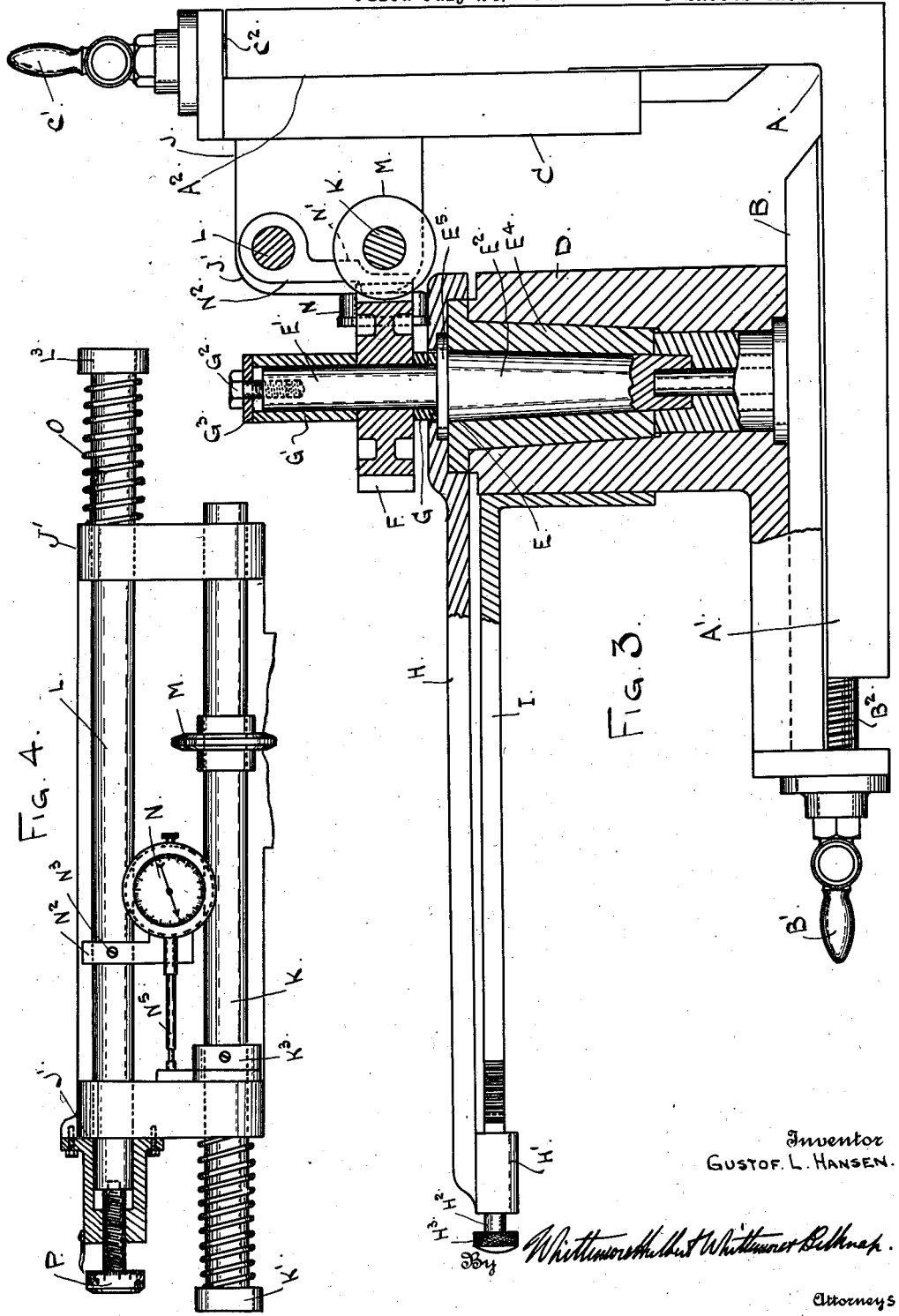

1,701,183

UNITED STATES PATENT OFFICE.

GUSTOF L. HANSEN, OF DETROIT, MICHIGAN, ASSIGNOR TO GEAR GRINDING MACHINE COMPANY, OF DETROIT, MICHIGAN, A CORPORATION OF MICHIGAN.

METHOD AND APPARATUS FOR TESTING GEARS.

Application filed July 24, 1922. Serial No. 577,182.

The invention relates to machines for testing gears and more particularly to that type of machine which measures the tooth contour of the gear.

The object of the invention is to measure the tooth curve of a gear with extreme accuracy in order that it may be compared with the theoretically correct tooth curve. The principle involved is the measurement of the amount of travel of a member cooperating with a gear tooth corresponding to predetermined rotative movements of the gear about a fixed axis. Preferably the cooperating member is mounted for linear movements and a sensitive indicating device provided for measuring the linear travel while the gear is rotated step by step through equal angular movements. With a given form of tooth curve such as the involute curve the successive increments of linear travel are calculated mathematically for each of the angular increments and the difference between the calculated measurement and the actual measurement of the gear to be tested represents inaccuracy of the gear tooth.

In the drawings:—

Figure 1 is a plan view of the gear testing machine;

Figure 2 is a front elevation thereof;

Figure 3 is a side elevation partly in section;

Figure 4 is a detailed view showing a modification of the indicating device.

In general construction the machine consists of a rotatable arbor on which the gear to be tested is secured and means for accurately revolving the same step by step through equal angular increments of rotation. A shaft is mounted for longitudinal sliding movements at right angles to the axis of the arbor and is provided with a projecting member which is adapted to engage with one side of a gear tooth below the base line of the same. The projecting member may have its contacting surface at right angles to the axis of the shaft or at any other angle but preferably the angle chosen is the same as the pressure angle of the gear tooth to be measured.

In my preferred construction, as shown in the accompanying drawings, A is a frame for the machine having the two portions A' and A² extending at right angle to each other on which are respectively mounted the carriages B and C. Suitable means for adjusting the carriages is provided such as the handle members B' and C' which rotate the screws B² and C² in threaded engagement respectively with the frame portions A' and A².

The carriage B supports a transversely extending pedestal D in which is rotatably mounted a spindle E having at one end a cylindrical portion E' of a suitable diameter to receive the gear to be tested F. The spindle is provided at its opposite end with a tapering shank E² which is sleeved in the tapering bushing E⁴ to maintain the axis of the spindle fixed during the various positions of rotative adjustment. The spindle also has an annular flange E⁵ between the cylindrical portion and the tapering portion which forms an abutment against which the gear F may be clamped. Any suitable means may be provided but as shown the gear F is clamped between the tubular members G and G' by means of the screw G² which extends through the clamping disc G³ and threadedly engages the spindle E'.

For rotating the gear and the spindle an arm H is secured to the spindle at its inner end and at its outer end is provided with an offset portion H' which is apertured to receive a pin H². A frame I secured to the pedestal D by the screws I² extends outward therefrom below the arm H and is provided with a notched quadrant I³ with which the pin H² is adapted to engage. The notches I' in the quadrant are spaced apart a sufficient distance to correspond with a small increment of rotation of the gear F for example 1°. The pin H² has a tooth H⁴ at its inner end which engages with the notches I' and at the opposite end is provided with a knob H³.

Mounted upon the carriage C is a frame J the end portions J' of which carry the slidable and rotatable rods K and L, the axes of which are parallel to each other and in planes perpendicular to the axis of the spindle E. A disk M is secured to the rod K and is adapted to enter a tooth space of the gear F. Preferably the disk M is tapered so that its cross section forms a rack tooth capable of cooperating with the gear F. In order to keep the disk M in engagement with the side of the gear tooth to be measured a spring K² is provided which is sleeved upon the rod K and abuts against the collar K' and the frame J'. The rod L is clamped to the frame J by means of the collars L' and the set screws L². An indicator N is secured to the rod L by means of the arm N' and the collar N² and may be adjusted in various positions on the rod by means of the set screws N³. The indicator is provided with a dial N⁴ and a stem N⁵. The rod K is provided with an adjustable collar K³ having an arm K⁴ secured thereto and extending into engagement with the stem N⁵ of the indicator.

In the operation of the machine the gear to be tested is clamped upon the spindle E and the carriages B and C are so adjusted that the disc M enters a tooth space at or above the base line of the gear. If one portion of the disc M becomes worn, the rod K may be rotated to bring a new portion of the disk into engagement with the gear whereby the life of the disk M may be increased. The collars N³ and K³ are then adjusted on the respective rods L and K so that the stem of the indicator abuts against the arm K⁴. The gear is then rotated through successive increments by means of the handle H and at each step of rotation the reading on the dial is noted. The difference between the successive readings of the indicator represents the linear travel of the disk M corresponding to the angular movements of the gear. The corresponding distances for a theoretically correct gear may be calculated and the differences between the calculated values and the values obtained from the gear to be tested will show the amount of variation of the tooth contour from the true value.

In the modification as shown in Figure 4 the indicator N is used to register the differences between the calculated values and the values obtained from the gear to be tested. The advantage of this modification is that the usual type of indicators are not accurate enough when measuring large distances, but, by measuring only the difference, accurate results may be obtained. Instead of having the rod L positively secured to the frame J, it is slidable therein and a spring O is sleeved upon the rod between the frame J' and the collar L³. A micrometer screw adjustment P is mounted upon the opposite end portion of the frame J' and serves to move the rod L with respect to the frame.

In the operation of the machine provided with the modification, when the gear is rotated by means of the handle H, the micrometer screw P is adjusted to move the rod L a distance corresponding to the calculated travel of the disk M with a theoretically correct gear. Thus the indicator registers only the difference between the theoretically correct travel and the actual travel of the disk. This procedure is repeated for each step of the rotation, the micrometer screw being adjusted at each step. In this manner the instrument may be used for directly reading the inaccuracies of tooth contour of the tested gear.

What I claim as my invention is:—

1. The method of determining the accuracy of a gear which consists in mounting the gear for rotation about its axis, rotating the gear upon its mounting, obtaining a rectilinear measurement predicated upon the rotary movement of the gear and comparing the said rectilinear measurement with a selected tolerance.

2. The method of determining the accuracy of a gear which consists in mounting the gear for rotation about its axis, rotating the gear upon its mounting through a predetermined partial revolution, obtaining a rectilinear measurement predicated upon the rotary movement of the gear and comparing the said rectilinear measurement with a selected tolerance.

3. The method of determining the accuracy of a gear which consists in mounting the gear for rotation about its axis, rotating the gear upon its mounting through successive increments of revolution, obtaining a rectilinear measurement predicated upon the rotary movement of the gear and comparing the said rectilinear measurement with a selected tolerance.

4. The method of determining the accuracy of a gear which consists in mounting the gear for rotation about its axis, rotating the gear upon its mounting, obtaining a rectilinear measurement predicated upon the rotary movement of the gear, and visually indicating the extent of the said rectilinear measurement.

5. The method of determining the accuracy of a gear which consists in mounting the gear for rotation about its axis, rotating the gear upon its mounting through a predetermined partial revolution, obtaining a rectilinear measurement predicated upon the rotary movement of the gear, and visually indicating the extent of the said rectilinear measurement.

6. The method of determining the accuracy of a gear which consists in mounting the gear for rotation about its axis, rotating the gear upon its mounting through successive increments of revolution, obtaining a rectilinear measurement predicated upon the rotary movement of the gear, and visually indicating the extent of the said rectilinear measurement.

7. A gear testing machine comprising a spindle fixed against longitudinal travel for receiving a gear, means for rotating said gear while on said spindle, a member adapted for rectilinear motion tangential to said gear about the axes of said spindle, a projection upon said member in contact with a tooth surface of said gear, and means for measuring the travel of said member.

8. A gear testing machine comprising a frame, a spindle for receiving a gear and secured to said frame, a rod journaled in said frame for rectilinear motion relative to said spindle, a rack tooth element projecting from said rod to enter a tooth space of said gear, means for yieldingly pressing said tooth against a tooth surface of said gear, means for rotating said gear while on said spindle through predetermined angular increments and means for measuring the corresponding linear travel of said rod.

9. A gear testing machine comprising a frame, a spindle for receiving a gear and journaled in said frame, a member slidable in said frame and having a projecting portion in engagement with a tooth surface of said gear, means for rotating said gear while on said spindle through successive predetermined angular increments, and means for measuring the corresponding travel of said member.

10. A gear testing machine comprising a frame, a spindle for receiving a gear and mounted upon said frame, a member slidable in said frame and having a projecting portion in engagement with a tooth surface of said gear, means for yieldingly resisting the movement of said rod in one direction, means for rotating said gear while on said spindle, and means for measuring the corresponding movement of said rod for successive increments of rotation of said gear.

11. A gear testing machine comprising a frame, carriages slidably mounted upon said frame at right angles to each other, a spindle upon one carriage for receiving a gear, a longitudinally slidable rod mounted upon the other of said carriages, a projecting member secured to said rod and adapted to enter a tooth space of said gear, means for yieldingly pressing said member in engagement with a tooth surface of said gear, means for rotating said gear while on said spindle, and an indicator for measuring the longitudinal movements of said rod.

12. A gear testing machine comprising a spindle for receiving a gear, means for rotating said gear while on said spindle, a member contacting with a tooth of said gear and adapted for movement tangentially thereof, and means for measuring the travel of said member.

13. A gear testing machine comprising a spindle for receiving a gear, means for rotating said gear while on said spindle, a member contacting with a tooth of said gear and adapted for movement tangentially thereof, a second member movable similarly to said first member, means for moving said second member a distance corresponding with the amount said first member would be moved when cooperating with theoretically correct teeth, and means for measuring the travel of said first member relative to said second member.

14. A gear testing machine comprising a spindle for receiving a gear, a member contacting with a tooth of said gear while the same is on the spindle and adapted for movement tangentially of the gear, a second member movable similarly to said first member, manually operable means for setting said second member to correspond with the theoretical amount of movement of said first member for predetermined angular movements of said gear, and means for measuring the travel of said first member relative to said second member.

15. The combination in a gear testing machine of means for mounting a gear for rotation, means for rotating the said gear while on the mounting means, a movable member, means cooperating with the gear and movable member for converting the said rotary motion of the gear into rectilinear motion of the movable member, and means for measuring the extent of such rectilinear motion.

16. The combination in a gear testing machine of means for mounting a gear for rotation about its axis, means for rotating the said gear, while on the mounting means, a movable member, means between the gear and movable member for converting the said rotary motion of the gear into rectilinear motion of the movable member, and means for visually indicating the extent of such rectilinear motion.

17. The combination in a gear testing machine of means for mounting a gear for rotation, means for rotating the gear while on the mounting means, means for limiting the rotation of the gear to a predetermined partial revolution, a movable member, means engaging the said gear and movable member for converting the rotary motion of the gear into rectilinear motion of the movable member, and means for measuring the extent of such rectilinear motion.

18. The combination in a gear testing machine of means for mounting a gear for rotation about its axis, means for rotating the gear while on the mounting means, means for limiting the rotation of the gear to a predetermined partial revolution, a movable member, means between the gear and movable member for converting the rotary motion of the gear into rectilinear motion of the movable member and means for visually indicating the extent of such rectilinear motion.

19. The method of measuring the accuracy of the tooth contour of a gear which consists in impressing upon an indicator the actual rectilinear movement of a member engaging a tooth surface of the gear, said movement corresponding to a determined angular adjustment of the gear whereby the differences between such movement and the theoretically correct movement are obtainable.

20. The method of measuring the accuracy of the tooth contour of a gear which consists in impressing upon an indicator the actual rectilinear movement, of a member engaging a tooth surface of said gear during a determined angular adjustment of the gear and also impressing upon said indicator the theoretically correct movement corresponding to said angular adjustment whereby the indicator will show the difference between the theoretical and actual movements.

21. The method of measuring the accuracy of a gear which consists in impressing upon an indicator the theoretically correct movement for the turning of the gear through a determined angle and also the actual movement of the surface of the gear tooth through such an angle so that the indicator will show the difference between the theoretical and the actual movements.

22. A gear testing machine including means for carrying a rotatable gear and a device for actuation by the teeth of such gear while the latter is on the said carrying means to indicate the curvature of such teeth, said device adapted to enter the tooth space of the gear and bear against the side of the gear tooth and having a bearing face which is curved about an axis transverse to the axis of the gear being tested, said device being adjustable about the said axis.

23. A gear testing machine including means for carrying a rotatable gear and a device adapted for actuation by the teeth of such gear while the latter is on the said carrying means to indicate the curvature of such teeth, said device adapted to enter the tooth space of the gear and bear against the side of the gear tooth and being adapted for adjustment in a direction across the teeth of the gear being tested so as to bring new and unworn surfaces of said device into operative engagement with the gear.

24. A gear testing machine including means for carrying a rotatable gear and a tapered disk engageable with a tooth surface of said gear while the latter is on the said carrying means, said tapered disk being movably mounted to indicate the curvature of the tooth.

25. A gear testing machine comprising a frame, a spindle on said frame for receiving a rotatable gear, a member mounted in said frame for rectilinear movement tangentially to the gear, and a disk carried by said member and engageable with a tooth surface of the gear while the gear is on the spindle, said disk having conical side surfaces and forming in axial cross section a rack tooth.

In testimony whereof I affix my signature.

GUSTOF L. HANSEN.